April 22, 1941.    D. B. CLARK ET AL    2,239,380
SLATING DEVICE
Filed Jan. 16, 1940    2 Sheets-Sheet 1

INVENTORS.
Daniel B. Clark
Grover Laube
BY
ATTORNEY.

Patented Apr. 22, 1941

2,239,380

UNITED STATES PATENT OFFICE 2,239,380

SLATING DEVICE

Daniel Bryan Clark and Grover Laube, Los Angeles, Calif., assignors to Twentieth Century-Fox Film Corporation, Los Angeles, Calif., a corporation of New York Application January 16, 1940, Serial No. 314,058

8 Claims. (Cl. 88—16.8)

This invention relates to motion picture cameras and deals with a device for "slating."

In operating motion picture cameras, it is customary to "slate" the film either before or after each "take." Ordinarily, slating consists in holding before the lens of the camera a slate, or a board, carrying indicia identifying that particular take. In motion picture parlance a take is used to mean an actual photographing of a scene. The present practice of slating, which consists in holding a slate, or a board, in front of the lens of the camera, has several objectionable features. It consumes time; it causes confusion, in that the actors, after having been set for a take, must be disturbed by the intrusion of a slate in front of the lens, which not only delays the take but upsets the principals.

Our invention has been conceived and designed for the purpose of eliminating such confusion by providing means in the camera whereby the slate may be photographed upon the film without using an outside indicia board. The device has been so designed that slating may be done on the run; that is, after the camera has started turning, a slate may be photographed either while the camera is coming up to speed or after it has reached speed, or the slate may be put on the film at the end of the take, if desirable. Also, it may be of any length. Since the device is a part of the camera, it may be operated by the cameraman, or his assistant, without noise or confusion, and will not disturb the principals in front of the camera.

In practice, our invention has been designed to be inserted between the camera and the magazine and, with minor alterations, can be made to operate on any type of motion picture camera. Accordingly, the principal object of our invention is to provide a slating device adapted to be mounted upon a motion picture camera, said device being operable by the camera operator. Another object of our invention is to provide a slating device wherein the indicia to be photographed upon the film may be quickly and easily changed to conform to various takes. Still another object is to provide a slating device, insertable between the magazine and the camera, to photograph slating indicia upon continuously moving film in the camera.

In photographing a slate upon a continuously moving film, where there is no relation between the photographing frame and the slating frame on the film, it is necessary to provide means whereby one complete slate will fall within a picture frame of the film when projected. In order to do this, we have designed a slating device so that two complete slat frames will fall within the area of an ordinary picture frame. Consequently, when the film is projected, it is immaterial how the slates are framed, since there are two slates per frame and, no matter how the film is threaded, there will always be one complete slate within a picture frame. Accordingly, it is another object of our invention to provide a slating device wherein two complete images of the slate are formed on the film within an area of an ordinary motion picture frame.

Other objects and advantages will become apparent as the description proceeds in conjunction with the drawings, in which.

Briefly stated, our invention amounts to incorporating a rotating refracting element, with means for rotating said elements by a continuously moving film, in such a manner that indicia carried on a slating card may be focused and exposed upon said continuously moving film.

Figure 1:
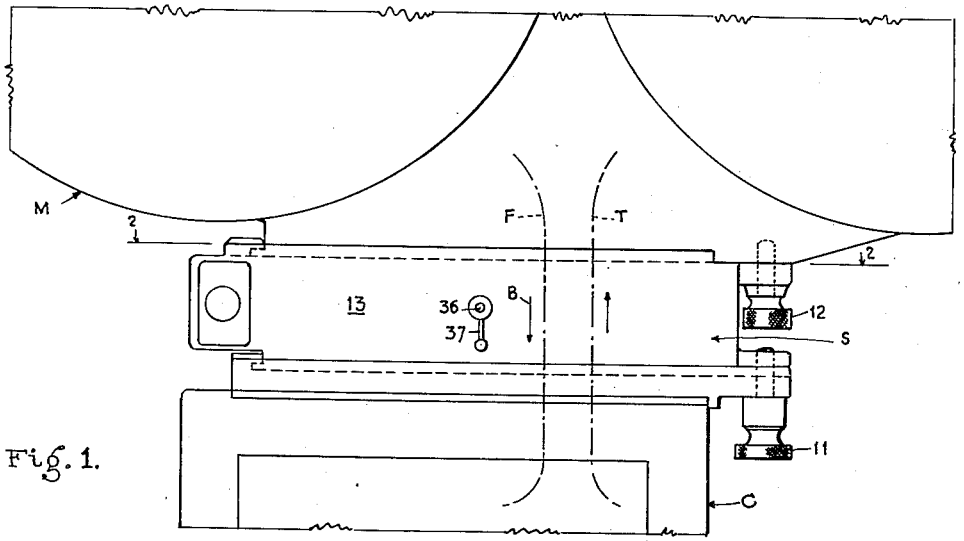
Figure 1 is a fragmentary side elevation of a camera case and a magazine showing our device as it would be applied between the camera case and the magazine.

In Figure 1, we have shown our device, generally designated S, as being mounted between a camera case C and a film magazine M. In practice the device S is adapted to be inserted between the case C and the magazine M and carries complementary surfaces on the top and bottom so that the slating device S is adapted to fit on the camera case in place of the magazine and in turn provides a seating surface on the upper side for the magazine. Under this arrangement, the only modification required in the ordinary camera set-up would be lengthening of the take-up belt. The device S is held in place on the case C by a means of a thumb nut 11 and the magazine in turn is held upon the device S by means of a second thumb nut 12.

Figure 2:
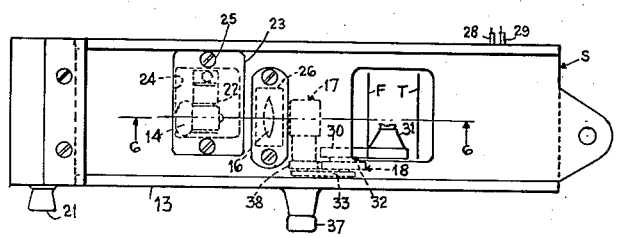
Figure 2 is a top plan view of our device and is taken on line 2—2 of Figure 1.
Figure 3:
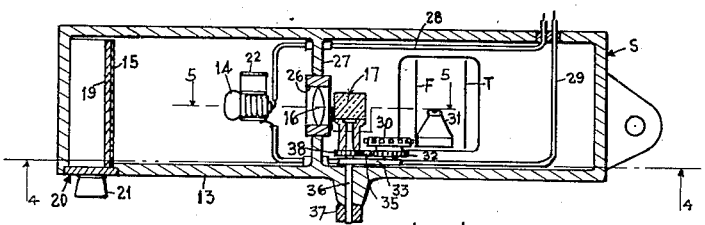
Figure 3 is a horizontal sectional view of our device taken on line 3—3 of Figure 4.
Figure 4:
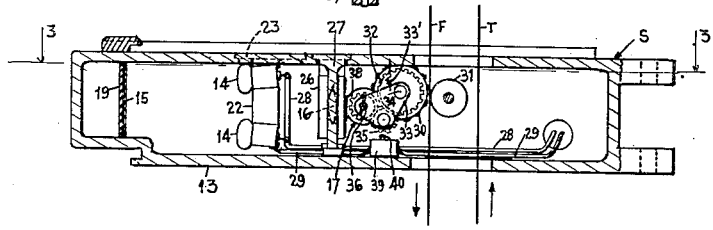
Figure 4 is a vertical sectional vew taken on line 4—4 of Figure 3.
Figure 5:
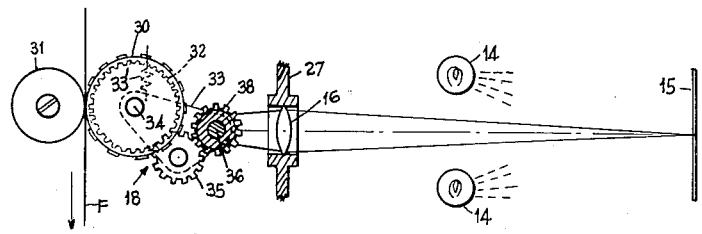
Figure 5 is a fragmentary vertical sectional view taken on line 5—5 of Figure 3.

Referring more specifically to Figures 2, 3 and 4 for the structural details of the slating device, it will be seen particularly in Figure 2 that, generally speaking, the device comprises a case 13, which is light proof in all respects, except for film apertures that are closed by the magazine and camera case, together with a source of light 14 adapted to transmit light to an indicia card 15, which in turn is focused upon a continuously moving film F by means of a lens 16 and a rotating refracting element 17.

In the preferred form of our arrangement, the slating indicia is exposed upon the film F, which is the film from the feeding compartment of the magazine M, but the indicia might equally as well be photographed upon the take-up film designated T with slight modifications. Means is also provided for rotating the element 17 by engagement with the traveling film F and is generally designated 18. The indicia card 15 may be detachably mounted upon a plate 19, which is a part of an insertable element, generally designated 20, that carries a knob 21. The element 20 is adapted to be quickly and easily withdrawn from the casing 13 for changing the indicia and is arranged to be light proof when inserted into the casing 13. As shown in Figure 4, we provide two sources of light 14, both of which are mounted upon a metallic strip 22 by means of clips of any suitable design, said strip in turn being supported upon an insulation member 23, which is adapted to fit over an opening 24 in the casing 13 and is held in place by means of screws 25. The lens 16 is mounted in a member 26, which is adapted to be positioned in a partition 27 that divides the interior of the casing into two light proof compartments, and the lens is so positioned that it will focus indicia on the card 15 upon the film F. Electric current is supplied to the lamps 14 through conductors 28 and 29 for supplying illumination to the card 15. The means for rotating the refracting element 17 comprises a toothed wheel 30 adapted to be moved to engage the film F and press the film F against a roller 31 in such a manner that the teeth on the wheel 30 will engage the sprocket holes in the film, or the wheel 30 may be a smooth friction wheel, the only requirement being that the wheel will travel at the same rate of speed as the film. The wheel 30 is fixed to a gear 32 so as to rotate the gear with the wheel and both the gear and the wheel are rotatably mounted upon a plate 33 upon a pivot 34. Also mounted upon the plate 33 is a gear 35 adapted to mesh with the gear 32. The plate 33 is in turn fixed to a shaft 36 that extends through the casing 13 and carries in its outer end a handle 37. The refracting element 17 is rotatably mounted upon the shaft 36 and is driven by means of a gear 38 meshing with the gear 35. From the foregoing it can be seen that by swinging the handle 37 the plate 33 may be swung downwardly until the wheel 30 engages the film F, whereupon the wheel 30 is driven at the same speed as the film and through the train of gears just described the element 17 is rotated. As before stated, it is one of the objects of the invention to place two slating images upon the film within the area of one picture frame. Accordingly, it will be noted that the gear ratio between the gear 32 and 38 is such that the refracting element will be rotated once while the film travels a distance of one picture frame. This will result in placing upon the film two images of the slating indicia within the area of one picture frame. The position of the lens will depend upon the size of the indicia card used. In conjunction with the above means for rotating the refracting element, we incorporate a switch 39 in the conductor 29 so arranged that, when the plate 33 is swung downwardly to bring the wheel 30 into engagement with the film F, a pin 40 will be depressed and the electric circuit will be completed through the lamps 14, thereby furnishing the illumination for the indicia card. The lights are normally off so as to prevent fogging of the film during actual photographing of scenes and the plate 33 is held in a normally elevated position by any suitable means, such as a spring 33', but it is obvious that the slating indicia may be photographed upon the film at any point and that by the mere operation of the handle 37 the film may be slated as desired.

Figure 6:
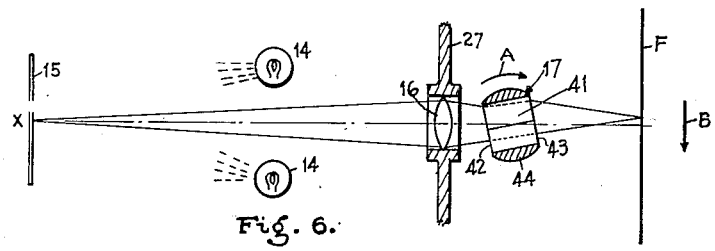
Figures 6, 7 and 8 are diagrammatic views showing the refracting optical system taken on lines 6—6 of Figure 2.
Figure 7:
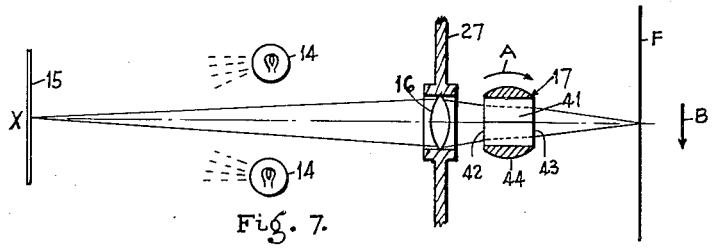
Figure 8:
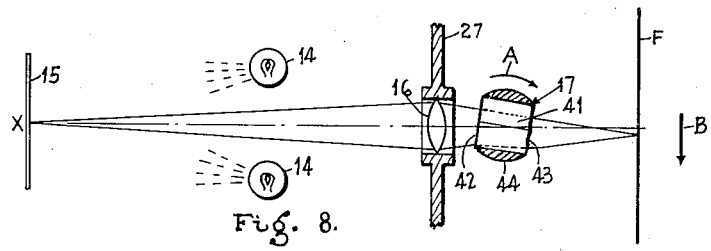

In Figures 6, 7 and 8, we have shown diagrammatic illustrations of the functions of the rotating refracting element 17. The refracting element 17 consists of a refracting substance, such as glass, designated 41, having two spaced parallel faces 42 and 43 carried in a rotatable mount 44. It will be noted that when the glass 41 is not transmitting light, the mount 44 acts as a shutter. In Figure 6, it will be noted that the center line X on the card 14 is projected above the optical center of the lens 16 on the film F, due to the angular position and the refracting power of the element 17. In Figure 7, it will be noted that the optical center line X on the card 15 is exactly on the center line of the optical system, and in Figure 8 the optical center line X is below the optical center of the lens 16. This movement of the projected image of the card 15 is brought about by rotating the refracting element 17 in the direction of the arrow A. The means for rotating the element 17, as previously described, is so synchronized with the travel of the film F in the direction of the arrow B that the image of the card 15 on the film F travels at the same speed as the film F. The result is that the element 17 works not only as a means of causing the image to travel at the same rate of speed as the film, but as a shuttering means for putting on successive images. As previously explained, the whole system has been so arranged and synchronized that two images of the card 15 will be light impressed upon the film F in the space of one motion picture frame, so that no matter how the film is threaded for projection, there will always be one complete slating frame on the screen. In addition, the whole device has been constructed as a single unit adapted to be inserted between the magazine and the case.

Having shown and described a preferred form of our device, we claim:

1. A slating device for motion picture cameras comprising a casing adapted to be inserted between the camera case and the magazine of said camera, a partition in said casing forming two compartments therein, means for inserting slating indicia into one of said compartments, means for illuminating said indicia, there being a passageway through the other of said compartments to pass film between said magazine and said camera case, a lens in said partition arranged to focus said indicia upon the film in said passageway, a rotatable refracting element mounted between said lens and film adapted upon rotation to deflect the image of said indicia upon said film in the direction of movement of said film, and means for rotating said refracting element to deflect said image synchronously with the movement of said film.

2. A slating device for motion picture cameras comprising a casing adapted to be inserted between the camera case and the magazine of said camera, a partition in said casing forming two compartments therein, means for inserting slating indicia into one of said compartments, means for illuminating said indicia, there being a passageway through the other of said compartments to pass film between said magazine and said camera case, a lens in said partition arranged to focus said indicia upon the film in said passageway, a rotatable refracting element mounted between said lens and film adapted upon rotation to deflect the image of said indicia upon said film in the direction of movement of said film, and means for rotating said refracting element to deflect said image synchronously with the movement of said film, said last mentioned means including a wheel arranged to rotate said refracting element, and means for optionally forcing said wheel into and out of engagement with said moving film.

3. A slating device for motion picture cameras comprising a casing adapted to be inserted between the camera case and the magazine of said camera, a partition in said casing forming two compartments therein, means for inserting slating indicia into one of said compartments, means for illuminating said indicia, there being a passageway through the other of said compartments to pass film between said magazine and said camera case, a lens in said partition arranged to focus said indicia upon the film in said passageway, a shaft extending through a wall of said casing, a refracting element rotatably mounted upon said shaft between said lens and said film and adapted upon rotation to deflect the image of said indicia upon said film in the direction of movement of said film, a plate fixed to said shaft, a wheel pivotally mounted upon said plate arranged to rotate said refracting element, and means externally of said casing for rotating said shaft to bring said wheel into and out of engagement with said moving film to rotate said refracting element.

4. A slating device for motion picture cameras comprising a casing adapted to be inserted between the camera case and the magazine of said camera, a partition in said casing forming two compartments therein, means for inserting slating indicia into one of said compartments, means for illuminating said indicia, there being a passageway through the other of said compartments to pass film between said magazine and said camera case, a lens in said partition arranged to focus said indicia upon the film in said passageway, a shaft extending through a wall of said casing, a refracting element rotatably mounted upon said shaft between said lens and said film and adapted upon rotation to deflect the image of said indicia upon said film in the direction of movement of said film, a plate fixed to said shaft, a toothed wheel pivotally mounted upon said plate, gears on said plate connecting said wheel to said refracting element, and an external handle on said shaft for rotating the same to bring said toothed wheel into and out of engagement with said moving film to rotate said refracting element.

5. A slating device for motion picture cameras comprising a casing adapted to be inserted between the camera case and the magazine of said camera, a partition in said casing forming two compartments therein, means for inserting slating indicia into one of said compartments, means for illuminating said indicia, there being a passageway through the other of said compartments to pass film between said magazine and said camera case, a lens in said partition arranged to focus said indicia upon the film in said passageway, a shaft extending through a wall of said casing, a refracting element rotatably mounted upon said shaft between said lens and said film and adapted upon rotation to deflect the image of said indicia upon said film in the direction of movement of said film, a plate fixed to said shaft, a wheel pivotally mounted upon said plate, means connecting said wheel to said refracting element so as to rotate said refracting element in a ratio of two to one to said wheel, and external means on said shaft for rotating the same to force said wheel into and out of engagement with said continuously moving film to rotate said refracting element.

6. A slating device for moving picture cameras comprising a casing adapted to be inserted between the camera case and the magazine of said motion picture camera, a partition in said casing forming two compartments therein, means for inserting slating indicia into one of said compartments, electrical means for illuminating said indicia, a switch for controlling said electrical means, the other of said compartments having a passageway therethrough to pass continuously moving film between said magazine and said camera case, a lens in said partition arranged to focus said indicia upon said moving film in said passageway, a shaft extending through a wall of said casing, a refracting element rotatably mounted upon said shaft between said lens and said film and adapted upon rotation to deflect the image of said indicia on said film in the direction of movement of said film, a plate fixed to said shaft, a wheel pivotally mounted upon said plate arranged to rotate said refracting element, and means externally of said casing for rotating said shaft to move said plate to force said wheel into and out of engagement with said moving film and to operate said switch to energize said electrical illuminating means.

7. A slating device for motion picture cameras comprising a casing adapted to be inserted between the camera case and the magazine of said camera, a partition in said casing forming two compartments therein, means for inserting slating indicia into one of said compartments, means for illuminating said indicia, there being a passageway through the other of said compartments to pass film between said magazine and said camera case, a lens in said partition arranged to focus said indicia upon the film in said passageway, a shaft extending through a wall of said casing, a refracting element rotatably mounted upon said shaft between said lens and said film and adapted upon rotation to deflect the image of said indicia upon said film in the direction of movement of said film, a plate fixed to said shaft, a wheel pivotally mounted upon said plate arranged to rotate said refracting element, means externally of said casing for rotating said shaft to bring said wheel into and out of engagement with said moving film to rotate said refracting element, and means for normally holding said wheel out of engagement with said moving film.

8. A slating device for motion picture cameras comprising a casing adapted to be inserted between the camera case and the magazine of said camera, said casing having complementary surfaces on the top and bottom thereof adapted to mount the magazine and to be mounted upon the camera case respectively, a partition in said casing forming two compartments therein, means for inserting slating indicia into one of said compartments, means for illuminating said indicia, the other of said compartments having a passageway therethrough to pass film between said magazine and said camera case, a lens in said partition arranged to focus said indicia upon the film in said passageway, a rotatable refracting element mounted between said lens and said film adapted upon rotation to deflect the image of said indicia on said film in the direction of movement of said film, and means for rotating said refracting element to deflect said image synchronously with the movement of said film.

DANIEL BRYAN CLARK.
GROVER LAUBE.